United States Patent [19]

Morrison, Jr. et al.

[11] Patent Number: 4,486,453
[45] Date of Patent: Dec. 4, 1984

[54] DESOLVENTIZING PROCESS

[75] Inventors: Lowen R. Morrison, Jr., Hamilton; John H. Phillips, Fairfield, both of Ohio

[73] Assignee: The Procter & Gamble Company, Cincinnati, Ohio

[21] Appl. No.: 453,090

[22] Filed: Dec. 27, 1982

[51] Int. Cl.$^3$ ............................................. A23F 5/20
[52] U.S. Cl. .................................... 426/478; 426/428
[58] Field of Search ............................. 426/428, 478

[56] References Cited

U.S. PATENT DOCUMENTS

| | | | |
|---|---|---|---|
| 897,840 | 9/1908 | Meyer et al. | 426/428 X |
| 953,643 | 3/1910 | Seisser | 426/428 |
| 1,977,416 | 10/1934 | Wilder | 426/428 |
| 2,016,634 | 10/1935 | Grethe | 426/428 X |
| 2,023,333 | 12/1935 | MacLang | 426/428 |
| 3,671,263 | 6/1972 | Patel et al. | 426/428 |
| 3,682,648 | 8/1972 | Mitchell et al. | 426/428 |
| 4,256,774 | 3/1981 | Strobel et al. | 426/428 |
| 4,308,291 | 12/1981 | Werkhoff et al. | 426/428 |

FOREIGN PATENT DOCUMENTS 6375 of 1906 United Kingdom ............... 426/428

OTHER PUBLICATIONS

Chemical Abstracts, vol. 43, (1949), 5882i.

*Primary Examiner*—Joseph Golian
*Attorney, Agent, or Firm*—Nancy S. Mayer; Rose Ann Dabek; Richard C. Witte

[57] ABSTRACT

This invention relates to a method for removal of residual solvent from decaffeinated coffee beans. In particular, differential pressure stripping comprises a method of flash evaporation of solvent from the beans by means of an alternating cycle of pressure variations. The time and steam requirements for desolventizing are reduced when compared to traditional methods for removal of the same solvent. This reduces the residence time of the coffee beans in conditions of high temperature and high moisture, thereby preventing negative flavor changes in the resultant coffee products.

20 Claims, No Drawings

DESOLVENTIZING PROCESS

BACKGROUND OF THE INVENTION

This invention relates to a method for removal of residual solvent from decaffeinated coffee beans. In particular, differential pressure stripping comprises a method of flash evaporation of solvent from the beans by means of an alternating cycle of pressure variations. The time and steam requirements for desolventizing are reduced when compared to traditional methods for removal of the same solvent. This reduces the residence time of the coffee beans in conditions of high temperature and high moisture, thereby preventing negative flavor changes in the resultant coffee products.

The commercial manufacture of decaffeinated coffee requires rather lengthy process times and large amounts of steam, resulting in higher costs for decaffeinated coffees than for nondecaffeinated coffee products. Decaffeination of green coffee beans typically involves five basic well-known steps comprising steaming, prewetting, caffeine extracting, solvent removal, and finally drying and cooling. The desolventizing or solvent removal step traditionally required several hours to complete. Processes employing up to 20 to 40 hours for desolventizing are known. Large quantities of steam are consumed in such processes.

Process improvements in recent years have decreased desolventizing times. The improved shorter times are dependent upon the solvent employed for decaffeination. Chlorinated hydrocarbon solvents can be removed from decaffeinated coffee beans in 1 to 4 hours using conventional steam stripping. See U.S. Pat. No. 3,671,263 to Patel et al (1972). Solvents known as difficult to remove, such as ethyl acetate, require longer times of about 7 to 9 hours using the conventional steam stripping described in Patel et al. The process of the present invention reduces the time necessary for desolventizing coffee beans of ethyl acetate to about 3 to 5 hours, a decrease in time of about 50%. Steam requirements are also reduced.

Conventional steam stripping of residual solvent from coffee beans involves diffusion of solvent from the coffee beans to the steam, and is usually carried out at a constant pressure, typically below atmospheric pressure at about 2.5 to 7.5 psia. See U.S. Pat. Nos. 1,977,416 to Wilder (1934) and 3,671,263 to Patel et al (1972). It is known that decreasing pressure increases steam velocity and thereby accelerates the desolventizing step. But decreasing pressure also decreases temperature, which must be maintained at or above the boiling point of the solvent in order for steam stripping to be effective. Thus, an optimum constant pressure is normally employed dependent upon the solvent boiling point.

The British Patent Specification No. 6375 to Meyer (1906) can be interpreted as disclosing the use of alternating different pressures for removal of specific solvents. Traces of benzene or of a mixture of benzene and alcohol can be removed from decaffeinated coffee beans by subjecting the beans to a current of dry pressure steam or alternately to a current of dry pressure steam and to a vacuum, preferably while keeping the beans continually in motion. A continuous cycle of pressure change is not specifically required. However, this method was later disclosed as ineffective for full removal of ethyl acetate. Elimination of residual ethyl acetate required wet steaming of the coffee beans for 13 to 15 hours to increase their moisture content to about 30%. See U.S. Pat. No. 2,016,634 to Grethe (1935).

The desolventizing process of the present invention is distinct from the known processes in several aspects. Rather than a diffusion of solvent from a solid phase material of high solvent concentration to a gas phase of lower solvent concentration, the mechanism of the present process comprises a flash evaporation of the solvent under reduced pressure. Ethyl acetate is the preferred solvent, for which the Meyer process was disclosed as ineffective. Also, Meyer's continual agitation of the coffee beans is not used. The specific bean moisture level employed for desolventizing in the Grethe process is not required by the present invention. The use of constant pressure as in conventional steam stripping is eliminated, and both time and steam requirements are reduced. The residence time of the coffee beans in conditions of high temperature and high moisture is thereby reduced, preventing negative flavor changes in the resultant coffee products.

Accordingly, it is an object of this invention to provide an improved desolventizing process for decaffeinated coffee beans.

Another object of this invention is to reduce the amount of steam required for desolventizing decaffeinated coffee beans.

Another object of this invention is to desolventize decaffeinated coffee beans by means of an alternating cycle of different distinct pressures such that the residual solvent is flash evaporated from the beans.

It is a further object of this invention to reduce the time required for removal of residual ethyl acetate from decaffeinated coffee beans.

These and other objects will become apparent from the following description and examples. All percents are by weight unless otherwise specified.

SUMMARY OF THE INVENTION

This invention relates to an improved method for removal of residual ethyl acetate from decaffeinated coffee beans. More specifically, the invention relates to differential pressure stripping of residual solvent from decaffeinated coffee beans by means of flash evaporation of the solvent through an alternating cycle of pressure variations. The decaffeinated beans are contained in one or more extraction vessels, preferably those used for the decaffeination step. Steam is continuously or intermittently passed through coffee beans which have a high solvent level upon completion of decaffeination. A reduced pressure is applied causing a reduction of the solvent boiling point to below the temperature of the coffee beans, resulting in a flash evaporation of the solvent from the beans. This action continues until the temperature within the beans falls to near the solvent boiling point at the reduced pressure. The evaporated solvent is removed by steam. The vessel is then isolated from the low pressure source. The vessel pressure is increased causing the steam to condense on and within the cooler beans until temperature equilibrium is reached at the increased pressure. The reduced pressure is again applied and the foregoing cycle is repeated until the residual solvent concentration drops to the desired level. On a periodic basis, individual vessels of desolventized beans are removed from the system and individual vessels of decaffeinated beans added.

DESCRIPTION OF PREFERRED EMBODIMENTS

A blend of different classes of coffee beans, or alternately a single class of coffee beans, is decaffeinated according to known procedures, preferably employing ethyl acetate as the decaffeinating solvent. For example, see U.S. Pat. Nos. 3,671,262 to Wolfson et al (1972) and 3,671,263 to Patel et al (1972). The preferred method is an accelerated countercurrent decaffeination process employing turbulent flow of the solvent.

The differential pressure steam stripping of the present invention is carried out by subjecting the decaffeinated coffee beans to a cycle of pressure variations while steam is continuously or intermittently passed through the coffee beans. The solvent stripping is preferably conducted in several vessels, although a single vessel batch desolventization is an alternative. More specifically, the process is a method for removing residual ethyl acetate from decaffeinated coffee beans comprising:

(a) flash evaporating ethyl acetate from the decaffeinated coffee beans at a pressure sufficient to lower the boiling point of the ethyl acetate and water mixture within the beans to below the temperature of the beans until temperature equilibrium is reached;

(b) increasing the pressure while flowing steam continuously or intermittently through the decaffeinated beans until temperature equilibrium is reached; and (c) repeating steps (a) and (b) in an alternating cycle.

Steam can be passed through the beans in step (a) either continuously or intermittently. Semi-continuous solvent removal can be maintained by periodically isolating and removing the desolventized coffee beans from one of the vessels, and introducing a vessel containing freshly decaffeinated beans.

The decaffeinated coffee beans are contained in one or more extraction vessels, usually columns, preferably those used for the decaffeination step. The steam is passed through each column from bottom to top. The steam is withdrawn from the top of the vessel and passed to a solvent recovery process. Throughout the operation individual columns of the desolventized beans are removed from the system and individual columns of solvent containing decaffeinated beans are simultaneously added, preferably about once per hour. In this manner, solvent removal is maintained as a semi-continuous operation in the overall process to decaffeinate green coffee beans. The number of columns in the system can vary from about 2 to about 15, preferably from about 3 to 5. Each vessel has a height at least 5 times larger than its diameter.

Differential pressure stripping can be employed with several decaffeination solvents, but is preferred when ethyl acetate is used for decaffeination. The process is most advantageous when used with solvents that are known as difficult to remove from decaffeinated beans, and that usually require several hours for removal by conventional means.

Control of the moisture content of the steam is essential. If the steam is too dry, solvent removal is impaired as the surfaces of the beans dry, trapping the solvent inside. If the steam is too wet, water stripping of the coffee beans occurs, decreasing both yield and flavor.

A low pressure or one below atmospheric pressure is first applied to the hot beans after the decaffeination step is completed. This reduces the solvent boiling point to below the current temperature of the solvent and beans and causes the solvent to quickly evaporate from the coffee beans via a mechanism similar to the operation of a flash evaporator. This is continued until the temperature within the bean falls to the azeotropic boiling point of the solvent-water mixture. The solvent is more volatile than water and is preferentially flash evaporated. Steam is employed to remove the evaporated solvent. The column is isolated from the low pressure source by closing a valve. The continuous or intermittent steam flow increases the column pressure to or above atmospheric pressure, and the steam condenses on and within the cooler beans. The bean temperature and moisture level are increased until temperature equilibrium is reached at the higher pressure. At this point the total liquid content of the bean is approximately the same as when the initial low pressure was applied, but a greater proportion of the liquid content is water from the condensed steam because of the preferential flashing of the solvent. The low pressure is again applied and the foregoing cycle is repeated until the residual solvent concentration drops to the desired level.

The low and high pressures can be both below atmospheric pressure or both above atmospheric pressure. Either one, but not both, of the pressures can be at atmospheric pressure. Also, the low pressure can be below atmospheric pressure and the high one at or above atmospheric pressure. The preferred pressure variation is from about 1 to about 5 psia (pounds per square inch absolute) to about 10 to about 20 psia.

The steam flow can be continuous throughout the entire cycle. The steam flow can be stopped during the complete lower pressure portion of the cycle. The steam flow can also be intermittent, i.e. stopped for a portion or part of either or both the high or low pressure portions of the cycle. Different steam flow rates may be used at the different portions of the cycle with either continuous or intermittent steam flow. Steam flow rates employed are from about 0 to about 1.50 lbs. steam per lbs. beans. Preferably, a faster steam flow rate is employed during the high pressure portion of the cycle and a slower steam flow rate is used during the low pressure portion of the cycle. The lower rate will aid in achieving the low pressure in a shorter time. The preferred method is to combine intermittent steam flow with varying steam flow rates such that the steam flow is stopped for part of the lower pressure portion of the cycle, a slow steam flow rate is employed for part of the lower pressure portion of the cycle, a faster steam flow rate is employed for part of the higher pressure portion of the cycle, and the steam flow is stopped for the remainder of the high pressure portion of the cycle.

The differential pressure method for removing residual solvent from decaffeinated coffee beans in its preferred mode comprises:

(a) flash evaporating solvent from the decaffeinated coffee beans contained in one or more vessels by continuous application of a reduced pressure sufficient to lower the solvent boiling point to below the bean temperature, until the temperature within the beans falls to near the solvent boiling point at the reduced pressure;

(b) injecting steam through the vessels to remove the evaporated solvent;

(c) isolating the vessel from the low pressure source, increasing the steam flow rate, and retaining the steam within the vessel, thereby causing the vessel pressure to increase and the steam to condense on and within the beans until temperature equilibrium at a higher pressure is reached;

(d) stopping the steam flow into the vessels while maintaining the higher pressure;

(e) repeating steps (a) through (d) in an alternating cycle;

(f) periodically isolating and removing the desolventized coffee beans from one of the vessels, and introducing a vessel containing freshly decaffeinated beans, thereby maintaining semi-continuous solvent removal.

Total cycle times can vary from about 10 to about 40 minutes, i.e. about 5 to about 20 minutes each for the higher and lower pressure portions of the cycle. Preferred total cycle times are for about 20 minutes, i.e. about 10 minutes each for the higher and lower pressure portions of the cycle. In the preferred method combining intermittent steam flow with varying steam flow rates, the lower pressure portion of the cycle with stopped steam flow continues for about 3 to about 15 minutes, preferably about 9 minutes. The lower pressure portion of the cycle with a slow steam flow rate continues for about 1 to about 7 minutes, preferably about 3 minutes. The higher pressure portion of the cycle with a high steam flow rate continues for about 3 to about 15 minutes, preferably about 7 minutes. The higher pressure portion of the cycle with no steam flow continues for about 1 to about 7 minutes, preferably for about 1 minute.

Use of the differential pressure method decreases steam requirements by about at least one third compared to conventional steam stripping of ethyl acetate. Only about a total of 1.0 to 4.5 lb. steam/lb. beans is required using differential pressure stripping compared to about 7.1 lb. steam/lb. beans for conventional steam stripping. The time required using the countercurrent differential pressure method is about 3 to 5 hours. This compares to about 7 to 9 hours for conventional steam stripping. This reduction of time and steam requirements reduces the residence time of the coffee beans in conditions of high temperature and high moisture, thereby preventing negative flavor changes in the resultant coffee products.

Subsequent to the removal of residual solvent from the coffee beans, partial drying of the beans in the columns is accomplished by applying a vacuum of about 1 to about 3 psia to the column while still hot to evaporate the water. A typical moisture drop for this procedure is about 4% to 5%. Further drying can be accomplished by introducing dry superheated steam into the column. Removal of surface moisture from the beans in this manner simplifies discharge of the coffee beans from the columns. The beans can be removed from the individual columns by means of gravity flow, air or nitrogen sparging, or a combination of these. The coffee beans are then ready for drying, roasting, or other processing.

Alternately, the coffee beans during differential pressure stripping may be contained in an agitating or fluidized bed in a mechanical mixer instead of a stationary bed in the decaffeination vessels. Desolventizing requires less steam in an agitated vessel but entails a longer time. Only about 1.6 lb. steam/lb. beans is used but desolventization requires 6 to 7 hours. This alternative is therefore not the preferred method.

EXAMPLE 1

Example 1 illustrates differential pressure stripping of residual ethyl acetate from decaffeinated coffee beans with intermittent steam flow and varying steam rates.

One column was loaded with about 360 lbs. of green coffee beans which were premoistened to about 30% and then decaffeinated using ethyl acetate saturated with water. Differential pressure stripping with intermittent steam flow such that the steam flow was stopped during part of the lower pressure portion of the cycle and during part of the higher pressure portion of the cycle, at a low rate during the remainder of the lower pressure portion of the cycle, and at a faster rate during the remainder of higher pressure portion of the cycle, was used for removal of residual solvent. As the column completed decaffeination, an initial pressure below atmospheric of about 1.9 psia was applied for about 10 minutes to decrease the boiling point of the solvent/water mixture in the beans and preferentially flash evaporate the solvent. After isolating the column from the vacuum source, steam was then injected into the column bottom at about 0.75 lbs. steam/hr. per lb. dry beans (about 270 lb./hr.) for about 7 minutes to raise the column pressure to about 14.7 psia (atmospheric pressure) and to increase the bean temperature. The steam flow was stopped and pressure was maintained for an additional time of about 3 minutes. Pressure was then decreased to about 2.9 psia to decrease the boiling point of the solvent/water mixture in the beans and preferentially flash evaporate the solvent. After about 7 minutes steam was then injected at a rate of about 0.14 to about 0.32 lbs./hr. per lbs. dry beans. The steam flow transported the evaporated solvent out of the top of the column. After an interval of about 3 minutes a valve at the top of the column was closed and the steam rate was increased to about 0.75 lbs. steam/hr. per lbs. dry beans to again pressurize the column to about 14.7 psia. The cycle was continuously repeated. The pressure and steam flow were alternated in this manner for a total cycle time of 20 minutes. Twelve such cycles were repeated in 4 hours to reduce the level of residual solvent to less than 2 parts per million. The operating conditions and results are listed in Table I.

TABLE I

Differential Pressure Desolventizing With Varying and Intermittent Steam Flows

| Weight Beans (lbs.) | Steam Rate (lbs./hr./lbs. beans) | Low Pressure (psia) | High Pressure (psia) | Cycle Time (min.) | Total Steam (lbs. steam/lb. beans) | Total Time (hr.) |
|---|---|---|---|---|---|---|
| Differential Steam Stripping Intermittent Steam Flow, Stationary Bed | | | | | | |
| 360 | 0.75 | — | 14.7 | 7 | 1.05 | 4.0 |
|  | 0 | — | 14.7 | 3 | — |  |
|  | 0 | 2.9 | — | 7 | — |  |
|  | 0.32 | 2.9 | — | 3 | 0.19 |  |
|  |  |  |  |  | 1.24 |  |

EXAMPLE 2

Example 2 illustrates differential pressure stripping of residual ethyl acetate from decaffeinated coffee beans with continuous steam flow.

Five columns were each loaded with 90 lbs. of green coffee beans which were premoistened to about 30% and then decaffeinated countercurrently in series using ethyl acetate saturated with water. Differential pressure stripping with continuous steam flow was used for removal of residual solvent. As each column was isolated from the decaffeination series, an initial pressure below atmospheric of 1.9 psia was applied for 10 minutes to decrease the boiling point of the solvent/water mixture and preferentially flash evaporate the solvent. Steam was then injected into the column bottom at a rate of 80 lbs./hr. The steam flow transported the evaporated solvent out of the top of the column. The outlet valve at the column top was closed to increase the column pressure to atmospheric causing the steam to condense on and within the cooler beans. After an interval of 10 minutes the pressure below atmospheric of 1.9 psia was again applied. The pressure was alternated in this manner at 10 minute intervals for a total cycle time of 20 minutes. During the second hour of desolventization the steam flow rate for each column was increased to 100 lbs./hr. during the pressurization portion of the cycle. During the third hour, the steam flow rate was 120 lbs./hr. and for the final half hour it was 140 lbs./hr. during the pressurization portion of the cycle. Duplicate runs were conducted and the results are listed in Table II. The solvent removal required only 3½ hours and used about 4.11 lbs. steam per lbs. beans.

TABLE II

Differential Pressure Desolventizing With Continuous but Varied Steam Flows

| | Weight Beans (lbs./ vessel) | Steam Rate (lb./ hr.) | Low Pressure (psia) | High Pressure (psia) | Cycle Time (min.) | Total Steam (lbs. steam/ lb. beans) | Total Time (hr.) |
|---|---|---|---|---|---|---|---|
| Differential Steam Stripping Continuous Steam Flow, Stationary Bed | | | | | | | |
| (a) | 90 | varied* | 1.9 | 14.7 | 20 | 4.11 | 3.5 |
| (b) | 90 | varied* | 1.9 | 14.7 | 20 | | 3.5 |

*Steam rate (lb./hr.)
Hour 1—80
Hour 2—100
Hour 3—120
Last ½ hour—140

EXAMPLE 3

Example 3 illustrates a comparison of conventional steam stripping with differential pressure steam stripping in a single vessel.

Conventional steam stripping was carried out by inroducing steam into the bottom of a decaffeination column containing 120 lbs. of decaffeinated coffee beans, passing it through the stationary bean bed, and removing the spent steam from the column above the bean bed level. The steam rate was 90 to 135 lbs./hr., and pressure was maintained below atmospheric at 4.4 to 5.4 psia. Five test runs were conducted and the results are listed in Table III. About 6½ to about 9 hours were required to reach a level of 5 ppm residue of solvent in the beans. Total steam requirements ranged from 5.8 to 8.3 lbs. steam per lbs. beans.

A stationary bed of 120 lbs. of decaffeinated coffee beans was desolventized using differential pressure stripping with a continuous steam flow. An initial pressure below atmospheric of about 1.9 psia was maintained on the column for 10 minutes to decrease the boiling point of the solvent/water mixture in the beans and preferentially flash evaporate the solvent. Steam was then continuously injected and flowed from the bottom to the top of the decaffeination column containing the beans. The column was isolated with continued steam flow to pressurize the column to about 11.8 psia. The steam condensed on and within the coffee beans. After an interval of 10 minutes the pressure below atmospheric of 1.9 psia was again applied. The pressure was varied in this manner at 10 minute intervals for a total cycle time of 20 minutes. Duplicate runs were conducted and the results are listed in Table III. A level of 5 ppm residue of solvent in the beans required about 3½ hours and about 2.7 to 3.4 lbs. steam per lbs. beans. Both time and steam requirements were much less than desolventizing using conventional steam stripping.

An agitating bed of 90 lbs. of decaffeinated coffee beans contained in a mechanical mixer was desolventized using differential pressure stripping with intermittent steam flow. The steam flow was stopped during the low pressure portion of the cycle. After an initial pressure below atmospheric of 1.4 psia, the pressure was varied between this level and about 14.7 psia (atmospheric pressure) at intervals of 3 or 10 minutes. Desolventizing was continued until only 5 ppm residual solvent remained in the coffee beans. Data from four test runs is listed in Table III. The steam requirements varied from 1.6 to 4.8 lbs. steam per lbs. beans and was less than that used in conventional steam stripping. The time required was from 4.8 to 6.6 hours, which is comparable to differential pressure stripping of a stationary bean bed with intermittent steam flow.

TABLE III

Desolventizing With Single Extraction Vessel

| | Weight Beans (lbs.) | Steam Rate (lb./ hr.) | Low Pressure (psia) | High Pressure (psia) | Cycle Time (min.) | Total Steam (lbs. steam/ lb. beans) | Total Time (hr.) |
|---|---|---|---|---|---|---|---|
| Conventional Steam Stripping, Stationary Bed | | | | | | | |
| (a) | 120 | 90 | 4.4 | — | — | 5.8 | 7.7 |
| (b) | 120 | 90 | 4.4 | — | — | 6.5 | 8.7 |
| (c) | 120 | 132 | 4.9 | — | — | 7.6 | 6.9 |
| (d) | 120 | 135 | 4.4 | — | — | 8.3 | 7.4 |
| (e) | 120 | 133 | 5.4 | — | — | 7.5 | 6.8 |
| Differential Pressure Stripping, Continuous Steam Flow, Stationary Bed | | | | | | | |
| (f) | 120 | 130 | 1.9 | 11.8 | 20 | 3.4 | 3.1 |
| (g) | 120 | 90 | 1.9 | 11.8 | 20 | 2.7 | 3.6 |
| Differential Pressure Stripping, Intermittent Steam Flow, Agitating Bed | | | | | | | |
| (h) | 90 | 130 | 1.4 | 14.7 | 6 | 3.5 | 4.8 |
| (i) | 90 | 130 | 1.4 | 14.7 | 6 | 4.8 | 6.6 |
| (j) | 90 | 58 | 1.4 | 14.7 | 20 | 2.1 | 6.5 |
| (k) | 90 | 70 | 1.4 | 14.7 | 20 | 1.6 | 6.0 |

What is claimed is:

1. A method for removing residual ethyl acetate from decaffeinated coffee beans in about 3 to about 5 hours comprising:
(a) flash evaporating ethyl acetate from the decaffeinated coffee beans contained in from one to about 15 vessels by continuous application of a reduced pressure sufficient to lower the boiling point of the ethyl acetate and water mixture within the beans to below the temperature of the beans thereby causing the ethyl acetate and water to evaporate with ethyl acetate evaporating preferentially over the water;
(b) isolating the vessel from the low pressure source, increasing the pressure by flowing steam continuously or intermittently through the decaffeinated beans and retaining the steam within the vessel thereby causing the steam to condense on and within the beans; and (c) repeating steps (a) and (b) in an alternating cycle.

2. A method according to claim 1 wherein steam is flowed through the beans continuously or intermittently during step (a).

3. A semi-continuous method according to claim 1 wherein the decaffeinated beans are contained in more than one vessel and one vessel of desolventized beans is removed from the series and one containing undesolventized beans is simultaneously added to the series at intervals of approximately one hour.

4. The method of claim 3 wherein about 0.5 to about 4.5 lbs. steam per lbs. beans is used to desolventize the decaffeinated coffee beans.

5. The method of claim 2 wherein the steam flow is continuous into each of the vessels during steps (a) and (b).

6. The method of claim 2 wherein the steam flow is only during the high pressure portion of the cycle of step (b), but not during the lower pressure portion of the cycle of step (a).

7. The method of claim 2 wherein the steam flow into each vessel is during a part of the low pressure portion of the cycle of step (a), and during all of the high pressure portion of the cycle of step (b).

8. The method of claim 2 wherein the steam flow into each vessel is only during a part of the low pressure portion of the cycle of step (a), and during a part of the high pressure portion of the cycle of step (b).

9. The method of claim 2 wherein the steam flow into each vessel is at a faster rate during the high pressure portion of the cycle of step (b) than during the low pressure portion of the cycle of step (a).

10. The method of claim 3 wherein the pressure of step (a) is from about 1 to about 5 psia, and the pressure of step (b) is from about 10 to about 20 psia.

11. The method of claim 3 wherein step (a) is continued for about 5 to about 20 minutes, and step (b) is continued for about 5 to about 20 minutes in an alternating cycle.

12. The method of claim 11 wherein steps (a) and (b) are each continued for about 10 minutes in an alternating cycle.

13. The method of claim 3 wherein the steam is introduced to each vessel at a rate of about 0.15 to about 1.50 lbs. steam per hour per lbs. beans.

14. The method of claim 3 wherein each vessel of the series has a height at least about 5 times larger than its diameter.

15. The method of claim 3 wherein the desolventized coffee beans are removed from each vessel by gravity flow, air or nitrogen sparging, or a combination of these.

16. The method of claim 1 wherein the vessels comprise mechanical mixers which continuously or intermittently agitate or fluidize the decaffeinated coffee beans.

17. A method for removing residual ethyl acetate from decaffeinated coffee beans in about 3 to about 5 hours comprising:

(a) flash evaporating ethyl acetate from the decaffeinated coffee beans contained in from 1 to about 15 vessels by continuous application of a reduced pressure of from about 1 to about 5 psia for from about 5 to about 20 minutes to lower the boiling point of the ethyl acetate and water mixture within the beans to below the bean temperature, thereby causing the ethyl acetate and water to evaporate with ethyl acetate evaporating preferentially over the water;

(b) isolating the vessel from the low pressure source, increasing the steam flow rate, and retaining the steam within the vessel for about 5 to about 20 minutes, thereby causing the vessel pressure to increase to about 10 to about 20 psia and the steam to condense on and within the beans;

(c) repeating steps (a) and (b) in an alternating cycle;

(d) periodically isolating and removing the desolventized coffee beans from one of the vessels, and introducing a vessel containing freshly decaffeinated beans, thereby maintaining semi-continuous ethyl acetate removal.

18. The method of claim 17 wherein the solvent is removed from the decaffeinated coffee beans in about 3 to about 5 hours using from about 0.5 to about 4.5 lbs. steam per lbs. beans.

19. The method of claim 17 wherein the steam flow rate is at a faster rate in the high pressure portion of the cycle than in the low pressure portion of the cycle.

20. The method of claim 17 wherein the vessels comprise mechanical mixers which continuously or intermittently agitate or fluidize the decaffeinated coffee beans.

* * * * *